(12) United States Patent
Jackson (10) Patent No.: US 6,341,017 B1
(45) Date of Patent: Jan. 22, 2002

(54) INTERLEAVED-TO-PLANAR DATA CONVERSION

(75) Inventor: Bernard G. Jackson, Atherton, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/181,073

(22) Filed: Oct. 27, 1998

Related U.S. Application Data (63) Continuation of application No. 08/775,791, filed on Dec. 31, 1996, now Pat. No. 5,867,179.

(51) Int. Cl.$^7$ .............................................. G06K 15/00
(52) U.S. Cl. ..................................................... 358/1.17
(58) Field of Search ................................. 358/1.9, 1.16, 358/1.17, 404, 444, 261.2–261.4, 75, 81; 345/530, 531, 533, 536, 545, 546, 549–550

(56) References Cited

U.S. PATENT DOCUMENTS

| 5,159,443 A | * | 10/1992 | Ando | 358/75 |
| 5,671,440 A | * | 9/1997 | Curry | 358/1.9 |

* cited by examiner

Primary Examiner—Arthur G. Evans
(74) Attorney, Agent, or Firm—Michael A. Glenn (57) ABSTRACT

Interleaved data are converted to a planar format by an algorithm that follows map cycles throughout a frame buffer. Such map cycles result from iterating a function that maps planar addresses to CMYK addresses. There are three phases to the algorithm: In phase I, a 1-Cycle is processed and all of its member indices that are <=MAX_HIT in the array firstHit[] are saved. In phase II, all indices between 1 and MAX_HIT are visited, skipping any indices that have already been in a cycle. As each cycle is converted, any hits to indices between 1 and MAX_HIT are directly recorded in the array hit[], so that indices that have been used are quickly skipped. Phase III is skipped unless there are still some copies left to process. In phase III, there is no more space for recording every hit individually. When looking for new cycles, only indices that are not multiples of anything in the 1-Cycle are considered. Also, once the remaining number of uncycled bytes drops below the 1-Cycle's length, all remaining cycles are known to belong to factors of Q, and the search is narrowed to those values only. When an index i is found that cannot be rejected for one of these reasons, the algorithm begins processing the indices cycle, but if the algorithm ever ends up at an index less than i, then this 1-Cycle has already been processed. In that case, the 1-Cycle is restored to its previous state by copying in the reverse direction, and the algorithm skips to the next candidate for i.

6 Claims, 6 Drawing Sheets

Breakdown of all Cycles:

Stationary Bytes (never moved)
0, 35

1-Cycle

2-Cycle

3-Cycle

5-Cycle

6-Cycle

7-Cycle

14-Cycle

15-Cycle

*FIG. 4*

| Address | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| Contents | 0 | 9 | 18 | 27 | 1 | 10 | 19 | 28 | 2 | 11 | 20 | 29 | 3 | 12 | 21 | 30 | 4 | 13 | 22 | 31 | 5 | 14 | 23 | 32 | 6 | 15 | 24 | 33 | 7 | 16 | 25 | 34 | 8 | 17 | 26 | 35 |

*FIG. 5a*

| Address | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| Contents | 0 | 1 | 18 | 27 | 4 | 10 | 19 | 28 | 2 | 9 | 20 | 11 | 3 | 12 | 21 | 30 | 16 | 13 | 22 | 31 | 5 | 14 | 23 | 32 | 6 | 15 | 24 | 33 | 7 | 29 | 25 | 34 | 8 | 17 | 26 | 35 |

*FIG. 5b*

| Address | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| Contents | 0 | 1 | 2 | 27 | 4 | 10 | 19 | 28 | 8 | 9 | 20 | 11 | 3 | 12 | 21 | 30 | 16 | 13 | 18 | 31 | 5 | 14 | 22 | 23 | 6 | 15 | 24 | 33 | 7 | 29 | 25 | 34 | 32 | 17 | 26 | 35 |

*FIG. 5c*

| Address | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| Contents | 0 | 1 | 2 | 3 | 4 | 10 | 19 | 28 | 8 | 9 | 20 | 11 | 12 | 13 | 21 | 30 | 16 | 17 | 18 | 31 | 5 | 14 | 22 | 23 | 6 | 15 | 24 | 27 | 7 | 29 | 25 | 34 | 32 | 33 | 26 | 35 |

*FIG. 5d*

| Address | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| Contents | 0 | 1 | 2 | 3 | 4 | 5 | 19 | 28 | 8 | 9 | 10 | 11 | 12 | 13 | 21 | 30 | 16 | 17 | 18 | 31 | 20 | 14 | 22 | 23 | 6 | 15 | 24 | 27 | 7 | 29 | 25 | 34 | 32 | 33 | 26 | 35 |

*FIG. 5e*

| Address  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| Contents | 0 | 1 | 2 | 3 | 4 | 5 | 6 | 28 | 8 | 9 | 10 | 11 | 12 | 13 | 21 | 30 | 16 | 17 | 18 | 19 | 20 | 14 | 22 | 23 | 24 | 15 | 26 | 27 | 7 | 29 | 25 | 31 | 32 | 33 | 34 | 35 |

*FIG. 5f*

| Address  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| Contents | 0 | 1 | 2 | 3 | 4 | 5 | 6 | 7 | 8 | 9 | 10 | 11 | 12 | 13 | 21 | 30 | 16 | 17 | 18 | 19 | 20 | 14 | 22 | 23 | 24 | 15 | 26 | 27 | 28 | 29 | 25 | 31 | 32 | 33 | 34 | 35 |

*FIG. 5g*

| Address  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| Contents | 0 | 1 | 2 | 3 | 4 | 5 | 6 | 7 | 8 | 9 | 10 | 11 | 12 | 13 | 14 | 30 | 16 | 17 | 18 | 19 | 20 | 21 | 22 | 23 | 24 | 15 | 26 | 27 | 28 | 29 | 25 | 31 | 32 | 33 | 34 | 35 |

*FIG. 5h*

| Address  | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| Contents | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |

*FIG. 5i*

INTERLEAVED-TO-PLANAR DATA CONVERSION

CROSS-REFERENCE TO RELATED APPLICATIONS

This application is a continuation of application Ser. No. 08/775,791, filed Dec. 31, 1996 now U.S. Pat. No. 5,867,179.

BACKGROUND OF THE INVENTION

1. Technical Field

The invention relates to the conversion of data from one format to another format. More particularly, the invention relates to the conversion of interleaved data to a planar data format, for example the conversion of interleaved CMYK image data to planar image data.

2. Description of the Prior Art

Color separation is used, for example, in color printing where each of three colors (i.e. cyan, magenta, yellow) and black are printed from separate print heads. Each print head receives data from a separate portion of the printer memory, such that four copies of an image are retained in memory. That is, a separate copy of the image to be printed is retained in memory for each color, where each copy contains only the information necessary to print a particular layer of the image. This technique is referred to as CMYK or planar printing because each color layer comprises a separate plane of the resultant image.

Color separation can also be effected by generating a word of data for each pixel in the image, where such data word contains all four layers of color information for that pixel. This technique is referred to as interleaved printing because each color layer is interleaved with each other color layer to produce a word of composite color information for each pixel.

Either of the above approaches produces data that correspond to a color image and that can be stored in a memory.

Often color images are input pixel by pixel, i.e. interleaved. That is, when an image is scanned, all the information for each pixel is scanned simultaneously because the scanner physically sees one pixel first and then the next pixel in sequential order. Thus, there is a physical motivation for using the interleaved format.

On the other hand, an obvious way of storing an image for multi-pass printing is by separating the different colors over four different color planes, e.g. cyan, magenta, yellow, and black. For example, a color laser printer prints in multiple passes, where there is a printing pass for each color plane. Thus, the printer may print a first pass in cyan. It prints a next pass in magenta, and then in yellow.

Thus, it can be seen that a scanner often produces image information in an interleaved format, while a four-pass laser printer prefers such information in a planar format.

Accordingly, in such devices as color copiers, which comprise both a color scanner for capturing a color image and a color printer for recording the image on paper, there is a need for efficiently and quickly converting from an interleaved format to a planar format. It is therefore desirable to provide a technique to process the two four-color data formats, while meeting the format needs of various input and output devices, where such input and output devices use some combination of these two formats One way of performing such conversion is to provide additional storage space, i.e. more memory, where an adequate buffer is available for each plane. Thus, the interleaved data are readily sorted in sequential order, for example in an interleaved CMYK color system, to four separate buffers, where there is one buffer for each color plane. While this approach is simple, a system having 128 MB total RAM storage capacity in which an image requires 117 MB of such storage, does not provide sufficient capacity to perform the foregoing calculation. The cost and space required to add additional memory for such calculation, e.g. an additional 117 MB of RAM, makes the implementation of such simple scheme prohibitively expensive.

It would be advantageous to provide a scheme that allows for data format conversion, e.g. between an interleaved data format and a planar data format, without significantly increasing the form factor, processor speed, or RAM memory requirements of the target device, e.g. a color copier or color laser printer.

SUMMARY OF THE INVENTION

The invention provides a technique for converting interleaved data to a planar format. The herein disclosed technique requires minimal processing power and only a small amount of additional memory. The invention comprises an algorithm that follows "map cycles" throughout a frame buffer. Such map cycles result from iterating a function that maps planar addresses to CMYK addresses as follows:

Let i=index of a planar byte in the frame buffer, then:

$C(i)$=index of CMYK value that belongs in planar byte i $=4i$, for $0<=i<N$, $=4(i-N)+1$, for $N<=i<2N$, $=4(i-2N)+2$, for $2N<=i<3N$, $=4(i-3N)+3$, for $3N<=i<4N$, where N=the number of pixels in the frame buffer (4N= number of bytes).

The preferred method of planarizing the frame buffer is:
1. Start at an index n that has not yet been converted. Set another index i equal to the index n.
2. Save the value at i.
3. Copy the value of C(i) to i.
4. Set the index i to the next index in the cycle, which is C(i).
5. If the new index i is not the same as the index n (from 1.), then go to 3.
6. Copy the saved value (from 2.) to the most recent i (from 5) that was not equal to n.
7. The cycle starting at n is now planarized.
8. Go to 1., unless the whole file is finished. A cycle is finished when 4N copies have been made.

A key aspect of the invention involves finding the next i in step 1. Thus, C(i) is written as:

$C(i)=(4i) \mod Q$, where $Q=4N-1$ (and its inverse is $C^{-1}(i)=(Ni) \mod Q$)

Using this form, it can be proven that:
All cycle lengths divide the 1-Cycle's length evenly (and therefore no cycle is longer than the 1-Cycle);
If a cycle is shorter than the 1-Cycle, then its lowest index is a multiple of a factor of Q; and
If the 1-Cycle includes index i, then any j-cycle includes index (ij mod Q);

where, an i-Cycle is the cycle which contains index i, and a cycle's length is equal to the number of distinct indices in the cycle.

Other factors taken into account include:

Indices 0 and 4N−1 are stationary (C(i)=i);

Indices Q/3 and 2Q/3 are stationary if 3 divides Q;

If $\{Q/(4^n)<=i<=Q/((4^n)-1)\}$, then $C^n(i) <=i$, and i is not the lowest index in its cycle.

Because there are no quick ways to determine whether a new index i is part of a cycle that has already been converted, the formula above with regard to $C^n(i)$ must be evaluated for every n, such that it is no different than iterating C(i) directly. Also, the structure of these cycles varies chaotically with N. A letter page sized buffer has only six cycles, each of length 10 million. If N is a pure power of four, it has the shortest possible cycles, and the greatest number of cycles. Values of N just one away from a power of four tend to have only a few cycles. Fortunately, typical page sizes tend to have few cycles.

There are three phases to the preferred algorithm according to the invention. The first two phases are order N, but the third phase takes an unpredictable amount of time. For a large value N, the third phase usually can be skipped or does not take long because the pathological N values that require significant amounts of Phase III time become increasingly spread out as N increases.

In phase I, the 1-Cycle is processed and all of its member indices that are <=MAX_HIT are saved in the array firstHit[] .

In phase II, all indices between 1 and MAX_HIT are visited, skipping any indices that have already been in a cycle (as recorded by the array firstHit[]). As each cycle is converted, any hits to indices between 1 and MAX_HIT are directly recorded in the array hit[], so that indices that have been used are quickly skipped when searching for future cycles.

Phase III is skipped unless there are still some copies left to process.

In phase III, there is no more space for recording every hit individually, so the rules noted above are invoked. When looking for new cycles, only indices that are not multiples of anything in the 1-Cycle are considered. Also, once the remaining number of uncycled bytes drops below the 1-Cycle's length, all remaining cycles are known to belong to factors of Q, and the search is narrowed to those values only. When an index i is found that cannot be rejected for one of these reasons, the algorithm begins processing the cycle, but if the algorithm ever ends up at an index less than i, then this 1-Cycle has already been processed. In that case, the 1-Cycle is restored to its previous state by copying in the reverse direction, and the algorithm skips to the next candidate for i.

DETAILED DESCRIPTION OF THE INVENTION

The invention provides a technique for converting interleaved data to a planar format, as disclosed below. The herein disclosed technique requires minimal processing power and only a small amount of additional memory.

Figure 1:
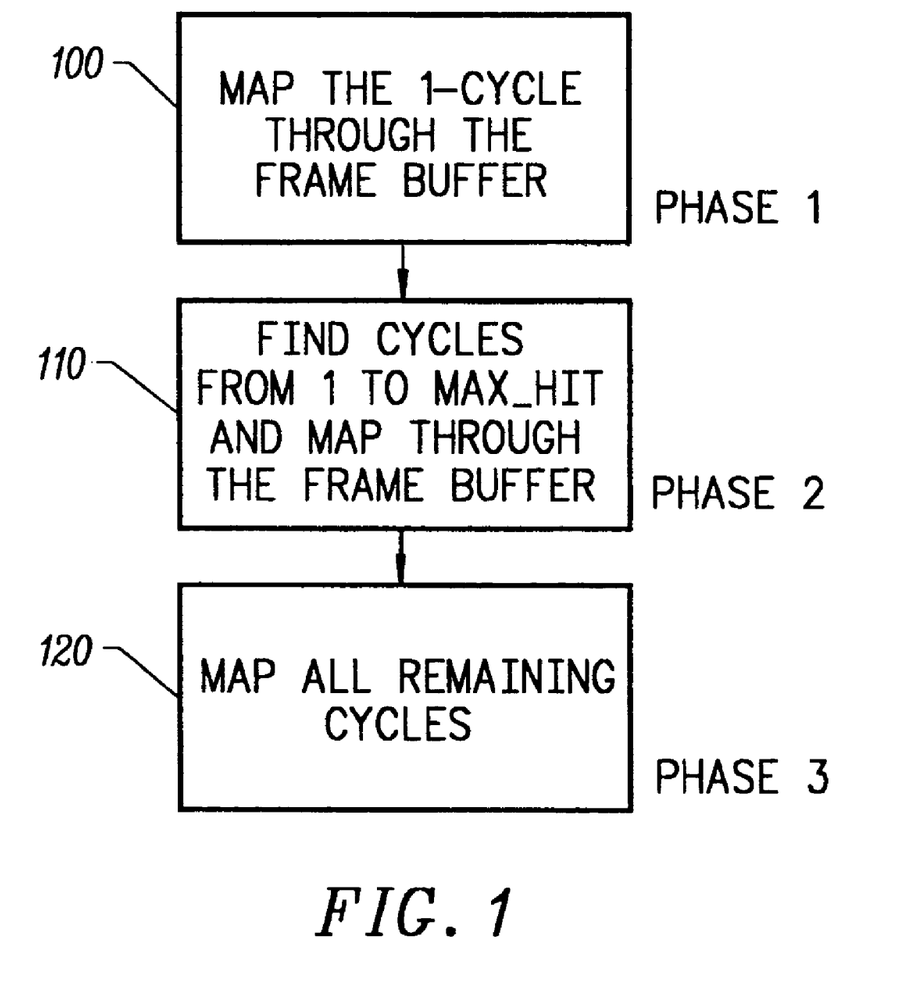
FIG. 1 is a flow diagram showing a three phase data format conversion technique according to the invention.

FIG. 1 is a flow diagram showing a three phase data format conversion technique according to the invention. The invention comprises an algorithm that follows a first map cycle throughout a frame buffer during a first phase (100), finds additional map cycles and maps through the frame buffer during a second phase (110), and then maps all remaining cycles during a third phase (120).

Such map cycles result from iterating a function that maps planar addresses to CMYK addresses as follows:

Let i=index of a planar byte in the frame buffer, then:

C(i)=index of CMYK value that belongs in planar byte i

=4i, for 0<=i<N,

=4(i−N)+1, for N<=i<2N,

=4(i−2N)+2, for 2N<=i<3N,

=4(i−3N)+3, for 3N<=i<4N, where N=the number of pixels in the frame buffer (4N=# bytes).

Figure 2:
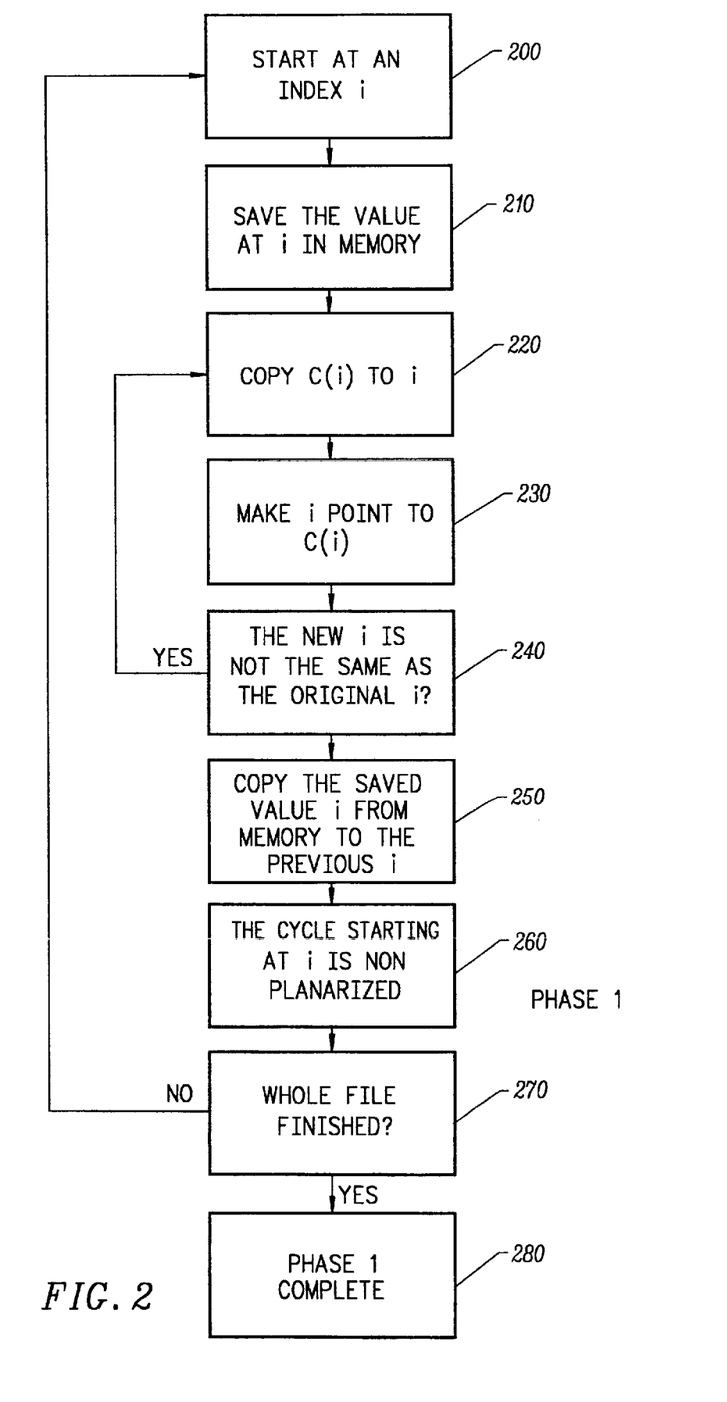
FIG. 2 is a flow diagram showing Phase 1 of the data format conversion technique according to the invention.

FIG. 2 is a flow diagram showing Phase 1 of the data format conversion technique according to the invention. FIG. 2 shows the eight different steps that are performed to convert one cycle of data from an interleaved format to a planar format. By following these eight steps, the algorithm passes through the entire cycle of data, and then returns back to the first pixel in the frame buffer with which the cycle started. The preferred technique for planarizing the frame buffer during any given i-Cycle is as follows:

1. Start at an index n that has not yet been converted (200). Set another index i equal to the index n.
2. Save the value at i (210).
3. Copy the value of C(i) to i (220).
4. Set the index i to the next index in the cycle, which is C(i) (230).
5. If the new index i is not the same as the index n (from 1.), then go to 3 (240).
6. Copy the saved value (from 2.) to the most recent i (from 5) that was not equal to n (250).
7. The cycle starting at n is now planarized (260).
8. Go to 1. (270), unless the whole file is finished. A cycle is finished when 4N copies have been made (280).

A key aspect of the invention involves finding the next i in step 1. Thus, C(i) is written as:

C(i)=(4i) mod Q, where Q=4N−1 (and its inverse is $C^{-1}(i)$=(Ni) mod Q)

Using this form, it can be proven that:

All cycle lengths divide the 1-Cycle's length evenly (and therefore no cycle is longer than the 1-Cycle);

If a cycle is shorter than the 1-Cycle, then its lowest index is a multiple of a factor of Q; and If the 1-Cycle includes index i, then any j-cycle includes index (ij mod Q);

where, an i-Cycle is the cycle which contains index i, and a cycle's length is equal to the number of distinct indices in the cycle.

Other factors taken into account include:

Indices 0 and 4N−1 are stationary (C(i=i);

Indices Q/3 and 2Q/3 are stationary if 3 divides Q;

If $\{Q/(4^n)<=i<=Q/((4^n)-1)\}$, then $C^n(i)<=i$, and i is not the lowest index in its cycle.

Because there are no quick ways to determine whether a new index i is part of a cycle that has already been converted, the formula above with regard to $C^n(i)$ must be evaluated for every n, such that it is no different than iterating C(i) directly. Also, the structure of these cycles varies chaotically with N. A letter page sized buffer has only six cycles, each of length 10 million. If N is a pure power of four, it has the shortest possible cycles, and the greatest number of cycles. Values of N just one away from a power of four tend to have only a few cycles. Fortunately, typical page sizes tend to have few cycles.

Figure 3:
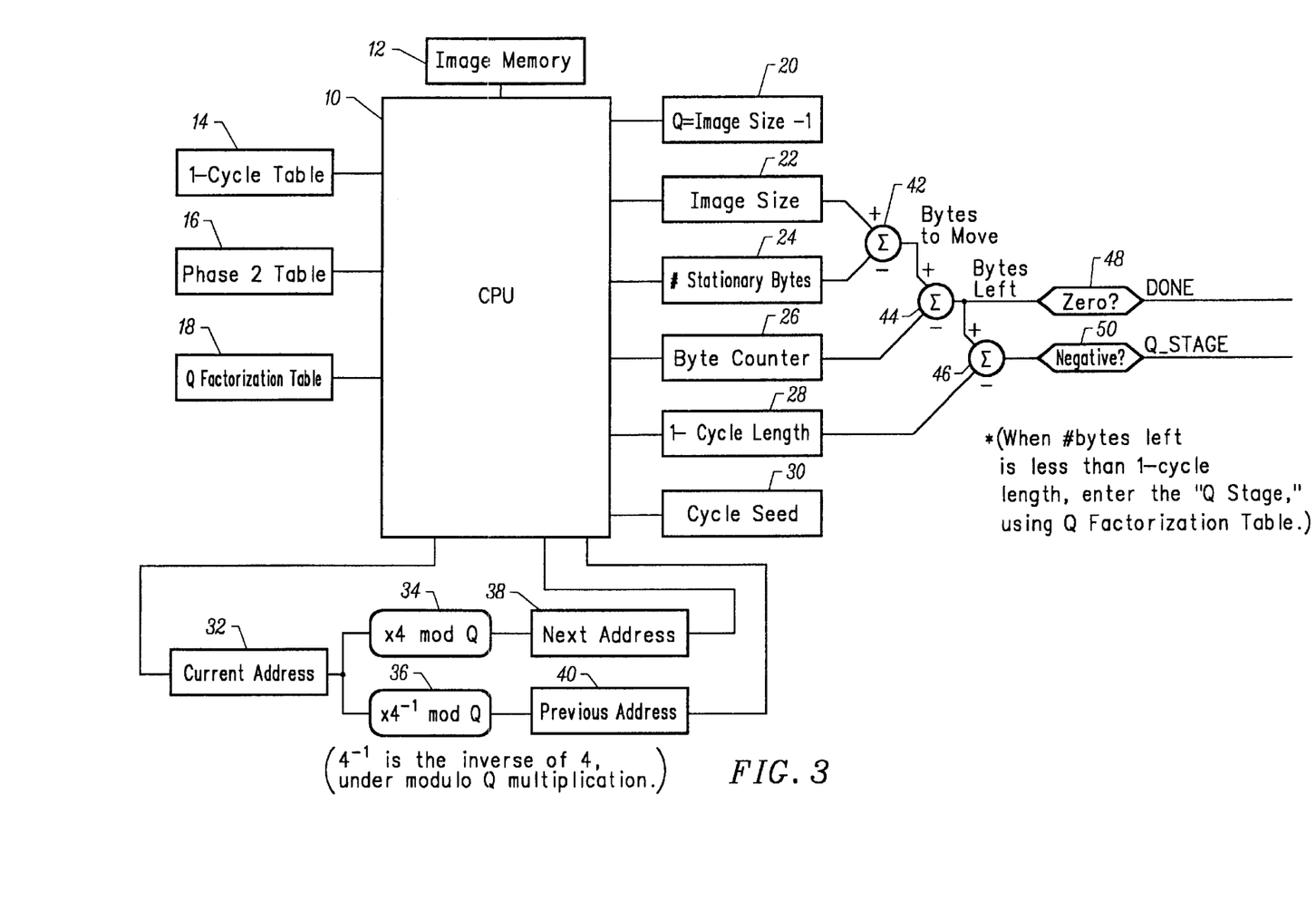
FIG. 3 is a block schematic diagram of a system for effecting a data format conversion according to the invention.

FIG. 3 is a block schematic diagram of a system for effecting a data format conversion according to the invention. System processing is effected by a CPU 10. The CPU has access to the frame buffer, i.e. image memory 12. The system includes a 1-Cycle table 14, a phase 2 table 16, and a Q factorization table 18, which are used to implement the algorithm herein described (as discussed in greater detail below). The CPU employs a current address register 32 when mapping a cycle through the frame buffer, as well as an (X4modQ) function 34 to determine the contents of a next address register 38, and an (X4$^{-1}$modQ) function 36 to determine the contents of a previous address register 40.

Registers are also provided to store a value Q=(Image Size)−1 (register 20), the image size 22, the number of stationary bytes 24, a byte counter 26, the 1-Cycle length 28, and a cycle seed 30. The values in various registers are used by the system to test for various conditions during execution of the algorithm. Thus, the contents of the number of stationary bytes register 24 are subtracted from the contents of the image size register 22 at a subtractor 42 and a resultant value has the contents of the byte counter 26 subtracted from it at a subtractor 44 to determine if zero bytes are left, via output 48, in which case processing of an image is completed. The output of the subtractor 44 has the contents of the 1-Cycle length register 28 subtracted from it at a subtractor 48 to determine if the number of bytes left is less than the 1-Cycle length, at which point the algorithm enters the Q factorization stage (discussed in greater detail below), as indicated via output 50.

As discussed above, there are three phases to the preferred algorithm according to the invention. The first two phases can be computed in order N time, but the third phase takes an unpredictable amount of time. For a large value N, the third phase usually can be skipped or does not take long because the pathological N values that require significant amounts of Phase III time become increasingly spread out as N increases.

In phase I, the 1-Cycle is processed and all of its member indices that are <=MAX_HIT are saved in the array firstHit[].

In phase II, all indices between 1 and MAX_HIT are visited, skipping any indices that have already been in a cycle. As each cycle is converted, any hits to indices between 1 and MAX_HIT are directly recorded in the array hit[], so that indices that have been used are quickly skipped.

Phase III is skipped unless there are still some copies left to process.

In phase III, there is no more space for recording every hit individually, so the rules noted above are invoked. When looking for new cycles, only indices that are not multiples of anything in the 1-Cycle are considered. Also, once the remaining number of uncycled bytes drops below the 1-Cycle's length, all remaining cycles are known to belong to factors of Q, and the search is narrowed to those values only.

When an index i is found that cannot be rejected for one of these reasons, the algorithm begins processing the cycle, but if the algorithm ever ends up at an index less than i, then this 1-Cycle has already been processed. In that case, the 1-Cycle is restored to its previous state by copying in the reverse direction, and the algorithm skips to the next candidate for i.

Once the eight steps shown on FIG. 2 are followed to complete one cycle, the algorithm returns to the first step and begins work on a next cycle. However, these eight steps do not determine the location in the frame buffer at which to find the starting point for a next cycle when a previous cycle, e.g. the first cycle, is completed. The invention herein employs various heuristics, such as the following key facts, to determine the location of such starting point (it will be appreciated that the following facts are provided to illustrate the presently preferred embodiment of the invention, but are not intended to limit the use of other facts in different embodiments of the invention).

The primary application of the invention is to convert interleaved data to planar data, i.e. where data in the form of 1 2 3 4, 1 2 3 4, 1 2 3 4, . . . is converted to 1 1 1 1 1, 2 2 2 2 2, . . .

A cycle may be thought of as a path through the data. For example, if there are N pixels in an image, then for a four-color separation there are 4N bytes. For purposes of the discussion herein, "address 0," is the first byte in an image data file and "address 4N−1" is the last byte in the image data file. Thus, four is a key number in this embodiment of the invention because CMYK color has four different planes.

A cycle is the path that is traversed through the data when the algorithm starts at any given address. Processing starts at that first address in the frame buffer and then the address is multiplied by four to find a new address. Eventually, the process encounters a number that is beyond the range of the system, i.e.—the 0 to 4N−1 range. Fortunately, there is no limit to how many times an address can be multiplied by four because the cycle wraps around the frame buffer from the end of the buffer to the beginning of the buffer when the 4N−1 boundary is passed. That is, the system is set for modulo four. Thus, the system contemplates a number Q, which is equal to 4N−1, where Q is the highest address that exists. Although the frame buffer is of finite size, counting by four finds addresses that are past the end of the frame buffer, and the cycle then wraps around to continue at the beginning of the frame buffer.

A cycle is completed when the next address found is the address at which the cycle started. This can occur after the address has wrapped around several times. All the addresses that were visited while traversing the data to return to this starting point are considered part of the cycle.

If all of the data are not addressed during a cycle, then it is necessary to perform a second phase to traverse every address of the data so that all of the data are converted from an interleaved format to a planar format.

The invention provides a technique that allows the algorithm to follow various heuristics to find a next cycle. To this end, the invention provides at least a partial list of the addresses that were visited during previous cycles.

At the start of a first cycle, it is necessary to provide an initial opening in the frame buffer, preferably at the first address in the cycle, that allows the algorithm to move the contents of each address visited to a previous address. In this sense, the invention operates in a manner similar to that of a puzzle in which puzzle pieces must be moved about in a matrix having a single open spot.

In operation, a cycle starts at Address 1. The algorithm looks at the value that is currently in Address 4 (modulo Q), and moves that value to Address 1. Although it has not yet been determined where the contents of Address 1 must go, it is known that the contents of Address 4 belong at Address 1. The contents of Address 1 are removed to make an opening into which the contents of Address 4 are placed. Now there is a hole at Address 4.

The value of Address 1 is saved somewhere else. If the contents at Address 4 are copied into Address 1, then there are two copies of the number that was at Address 4. One of them is still at Address 4 where it started and the other is at Address 1, which is its correct final destination. Accordingly, one can now think of Address 4 as an opening because the number that is there is no longer needed. From this point on, a cycle is a simple mechanical operation in which there is always one address that contains a number that is no longer needed.

The starting point, i.e. Address 1, is put into a table that can comprise a small piece of hardware, e.g. a small section of RAM. If one imagines the opening moving around in the frame buffer, then the cycle continues uninterrupted until the opening ends up at the location at which the cycle started. If the cycle covers the entire image file, then the conversion is complete.

A second part of the inventive algorithm addresses the problem of finding the start of the next cycle. It is necessary to scan through the frame buffer and find the first address that has not been changed during the previous cycle, e.g. a byte in the image that has not been moved yet.

To solve this problem, the invention allocates a small portion of memory (e.g. the 1-Cycle table 14 of FIG. 3) in which a flag is created for every byte near the beginning of the image. The invention sets the flag every time an address in the memory is visited during a cycle. By constructing an array of such flags in memory, it is then possible to pass through the array of flags to locate the first flag that is not yet set, i.e. the first address that has not been visited before completion of the previous cycle. Thus, the first location that does not have a flag set is the location of the beginning for the next cycle.

Such array requires only enough memory to store a small number of pixels, e.g. the first 256 pixels in the preferred embodiment of the invention. The first phase in the cycle uses the array as a map of the addresses that have been, or have not been, visited during the cycle. Thus, as the algorithm proceeds through a cycle, the array provides a subset of the cycle that comprises the first 256 addresses in the frame buffer. When the cycle is completed, the array provides a sub-picture of the frame buffer that is an acceptable representation of what happened in the frame buffer during the cycle.

The invention may thus be thought of as proceeding in phases where:
  Phase 1 performs a first cycle and sets a flag for each address that belongs to the cycle, within the first 256 addresses.
  Phase 2 constructs the array of the first 256 addresses, continues to look for the cycles that were not visited during Phase 1. It planarizes all such cycles which start at indices between 1 and MAX_HIT, and it records all indices between 1 and MAX_HIT in the array hit [], for reference during Phase 3.
  Phase 3 proceeds when the array used in Phase 2 is depleted, such that the array can no longer be used to identify the starting address of a next cycle. Thus, Phase 3 provides alternative methods for finding the starting address of a next cycle.
    It is important to note that in all phases, it is a mathematical certainty that the herein disclosed algorithm cannot accidentally replace a value in the frame buffer that has already been replaced in a previous cycle because each cycle is determined by iterating an invertible mathematical function. Because this function is invertible, it is not possible for two different cycles to contain any locations in common. If a location visited while processing the current cycle belongs to the set of a previous cycle, then such location by definition cannot be traversed during the present cycle. Thus, each address belongs to one and only one cycle.

The following discussion, concerns the operation of invention, especially with regard to Phase 3:

Phase 3 starts with the first address that is beyond the limit of the array. The algorithm scans from that point forward until an address is found that is not a multiple of any address that had been a member of the 1-Cycle, where the 1-Cycle is the cycle that starts at Address 1.

For example, imagine that the 1-Cycle contains the number 2. Thus, there is an Address 1 and there is an Address 2 next to Address 1. In this example, when performing Cycle 1, the mapping through the frame buffer wrapped all the way around and hit Address 2. The mapping then wraps around again (and again, as appropriate), and eventually returns to Address 1. Accordingly, Address 2 is a member of the 1-Cycle. In this example, once Phase 3 begins, the algorithm ignores all even addresses because the number 2 (i.e. Address 2) is a member of the 1-Cycle. As a result, the 1-Cycle automatically indicates that every even address will already have been part of a cycle by the time it is reached as a candidate for the beginning of a new cycle.

Thus, if the 1-Cycle includes Index I, then any J cycle includes Index I-J. In this example, if J is the "5" cycle, then the five cycle then must include Index 10, i.e. starting at 5, if the address is multiplied by four enough times, the "5" cycle ultimately includes 10.

In Phase 3, the 1-Cycle table identifies those numbers that were not hit during the 1-Cycle. Any numbers that were hit during the "1" Cycle, and any multiples of those numbers, are ignored during Phase III. That is, if a number is indexed, then it has been hit. In Phase III, the algorithm tries to find a number that is relatively prime, i.e. a number that is not a multiple of any of the numbers that have already been hit. Such number is selected as a starting point that begins a next cycle. During such cycle it is possible that the algorithm may hit an address that has a lower value than the address at which the cycle started. For example, if the cycle starts at 175 and, by multiplying by four, eventually wraps around the frame buffer to end up at 100, then the cycle is a cycle that has already been performed because the cycle starts from a position that was in a previous cycle. That is, the algorithm has hit a position that has already been visited while processing a previous cycle (that is, starting at the first available starting location 175 lead to position 100 that was already visited and therefore, by definition, location 175 is part of the cycle that includes 100).

The algorithm then stops because the cycle containing location 175 has been performed. Whatever moving of data that occurred during this cycle is then undone, and the algorithm then goes forward and looks again for a starting point for a next cycle.

The next stage of Phase III provides an optimization at a point where the number of locations that have not yet been visited is smaller than the size of the 1-Cycle. This is determined by looking at the 1-Cycle length register 28 (FIG. 3). The algorithm looks at the register, subtracts the value therein from the value contained in the byte counter 26, and determines that the number of bytes left is less than the 1-Cycle length. The algorithm then enters the Q factorization stage which takes advantage of the fact that, not only is the 1-Cycle the longest cycle, but that any cycle shorter than the 1-Cycle must begin at a multiple of a factor of the 1-Cycle's length.

For example, if the 1-Cycle is length 15, meaning that there are 15 different addresses within this cycle, then every other cycle must either be of length 15, or something that divides 15, so that the only options are 5 and 3. Accordingly, all cycles in this example are either length 15, length 5, or length 3.

The algorithm also exploits the fact that, if a cycle is shorter than the 1-Cycle, then its lowest index is a multiple of a factor of this number Q, where Q is the 4n−1 number, which, in the example herein having seven pixels, is 27. So Q is one less than the total number of bytes, as contained in the Q=(Image Size)-1 register 20. Thus, if the algorithm ever determines that there is less than the 1-Cycle remaining and Q is a value, e.g. 27 in this example, then the only remaining cycles that are possible are those that are factors of 27, i.e. 3 and 9. At this point the algorithm stops because, not only is it possible to exclude all multiples of locations that are in the 1-Cycle, but it is now known that the only locations that are left to be visited are multiples of those that divide into Q. This narrows the search even more.

Thus, the preferred embodiment of the invention includes a Q factorization table 18 (see FIG. 3) that contains a list of all the factors of Q. Each time the algorithm looks at a new address during Phase III, there is a determination if the value stored at the address is a multiple of one of the factors of Q. Instead of rejecting the multiples of these values, the algorithm only accepts the multiples of these values. Thus, Phase III both eliminates locations and multiples thereof already visited, and is restricted to locations found in the Q factorization table.

Figure 4:
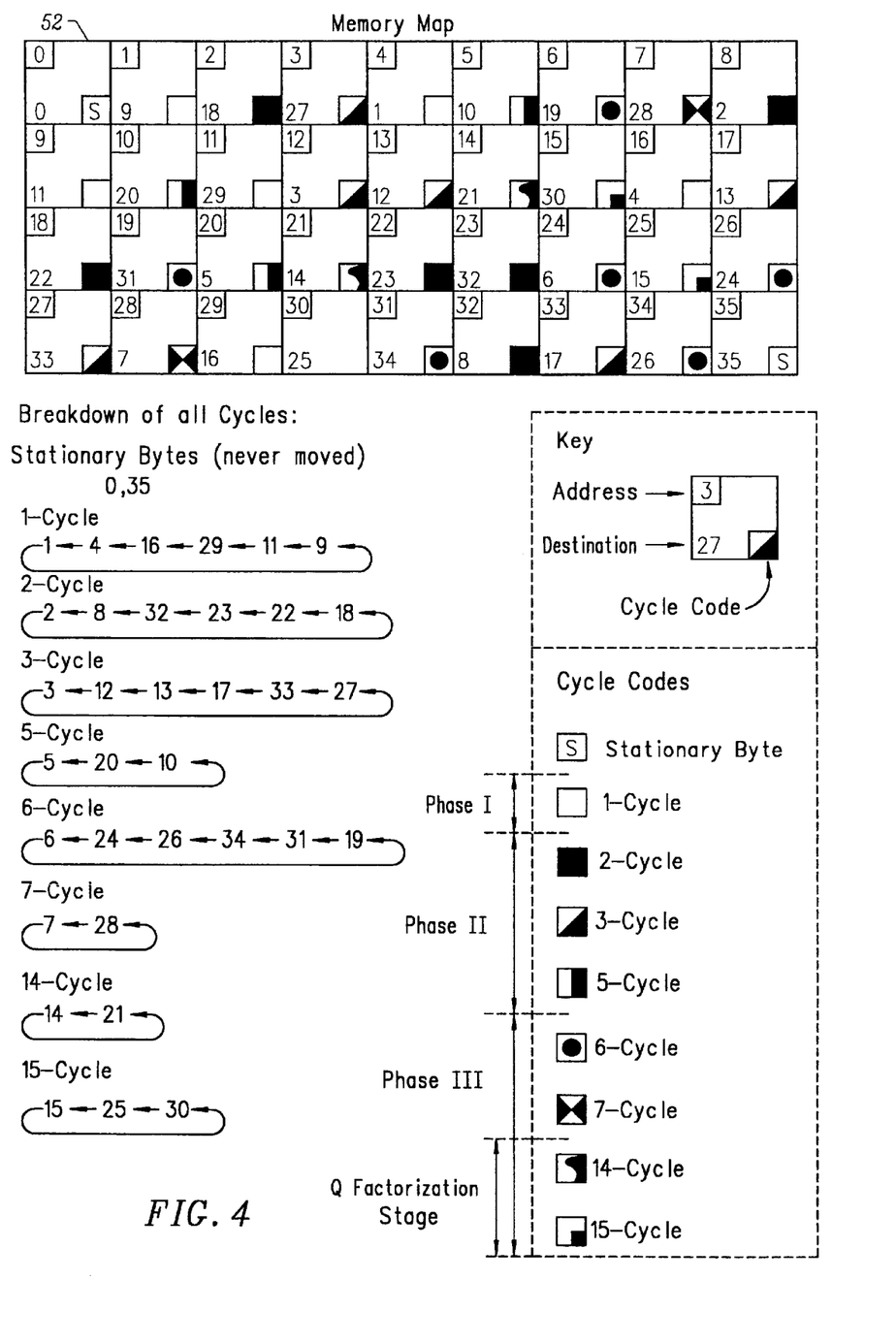
FIG. 4 provides an example that illustrates the conversion of interleaved data to a planar format according to the invention.

FIG. 4 provides an example that illustrates the conversion of interleaved data to a planar format according to the invention. In the example there are N=9 pixels and a table size of five bytes (see the memory map 52). FIG. 4 shows a breakdown of all cycles and relates each cycle to one of the three phases of the herein described conversion algorithm. Thus, the figure shows the 1 Cycle during phase I, the 2-, 3-, and 5-cycles during phase II, the 6- and 7-cycles during phase II, and the 14- and 15-cycles during a Q-factorization stage (discussed in greater detail below). In the figure, cycle codes are provided to identify the location visited during the various cycles.

FIGS. 5a–5i provide an example that further illustrates the conversion of interleaved data to a planar format shown in FIG. 4.

Figure 5A:
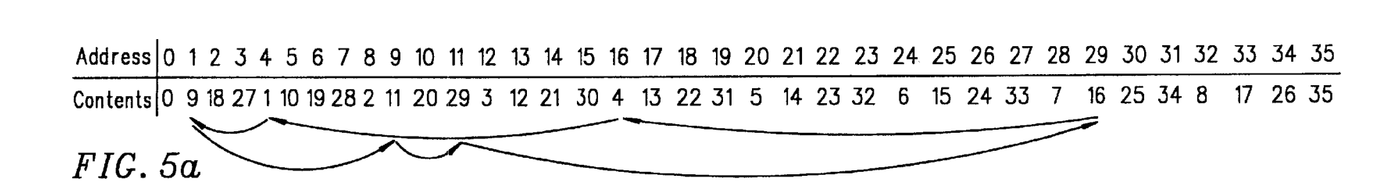
FIGS. 5*a*–5*i* provide an example that further illustrates the conversion of interleaved data to a planar format, as shown on FIG. 4.

FIG. 5a provides an interleaved starting configuration, where N=9 and Q=35. The arrows in the figure show the byte copies required to planarize the 1-Cycle. Members of the cycle include 1, 4, 16, 29, 11, and 9, based upon 1×4=4, 4×4=16, 16×4=64mod35=29, 29×4=116mod35=11, and 11×4=44mod35=9.

Figure 5B:
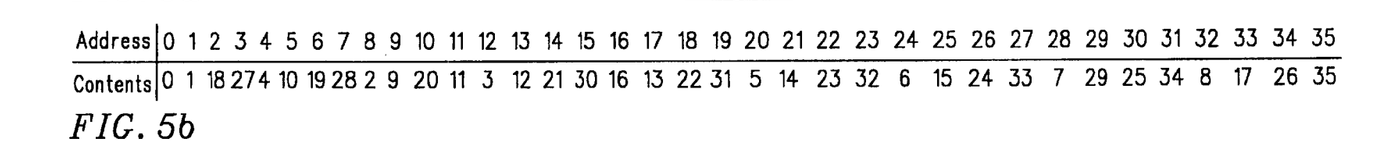
Figure 5C:
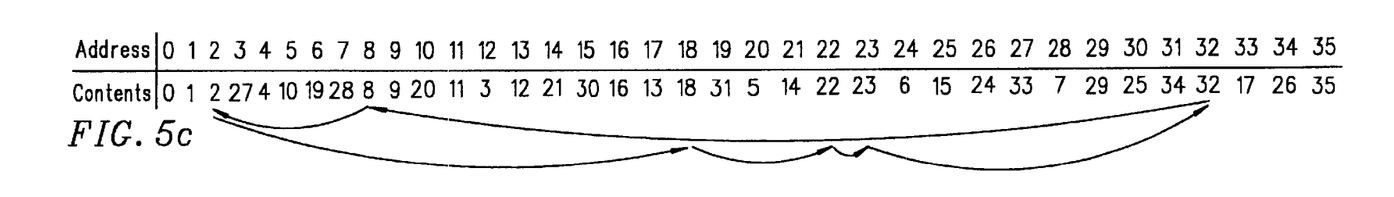

After planarizing the 1-Cycle, where the length of the 1-Cycle is L=6, the frame buffer resembles the configuration shown in FIG. 5b. The algorithm makes the 1-Cycle table and starts the Phase II table, where the table size is 5. The 1-Cycle table indicates that addresses 1 and 4 have been planarized. The Phase II table is initialized so that it is identical with the 1-Cycle table.

Phase II begins. The first unplanarized entry in the 1-Cycle table is Address 2, so the algorithm planarizes the 2-Cycle (see FIG. 5c). The 2-Cycle consists of 2, 8, 32, 23, 22, and 18, and also has a length L=6. After planarizing the 2-Cycle, the Phase II table indicates that addresses 1, 2, and 4 have been planarized.

Figure 5D:
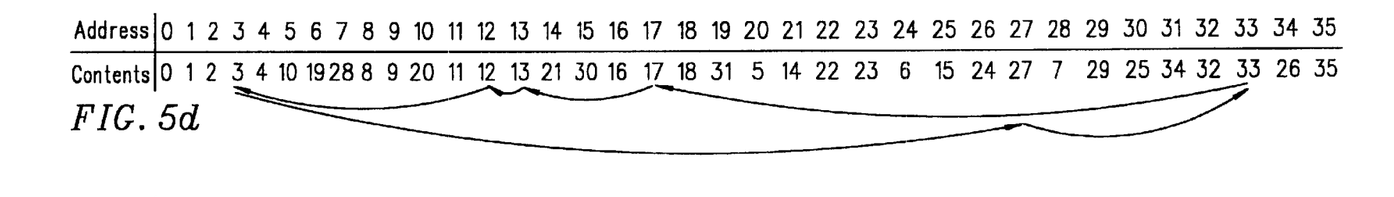
Figure 5E:
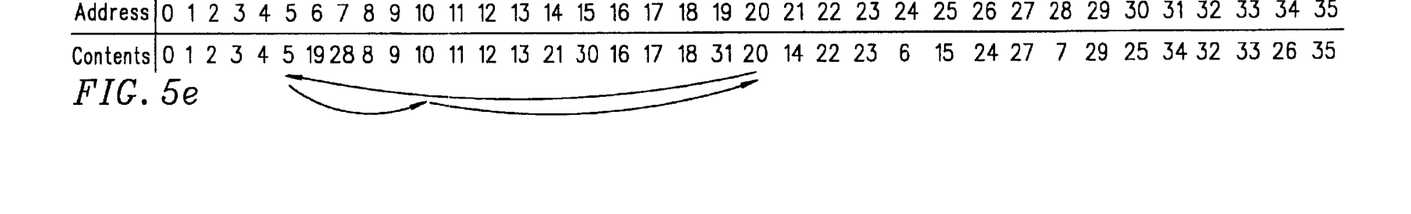
Figure 5F:
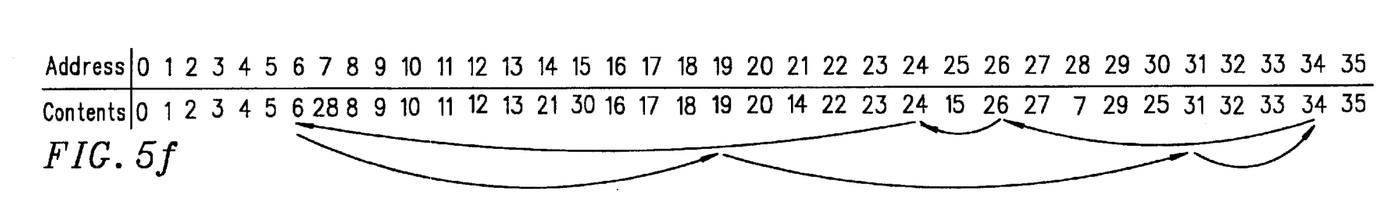
Figure 5G:
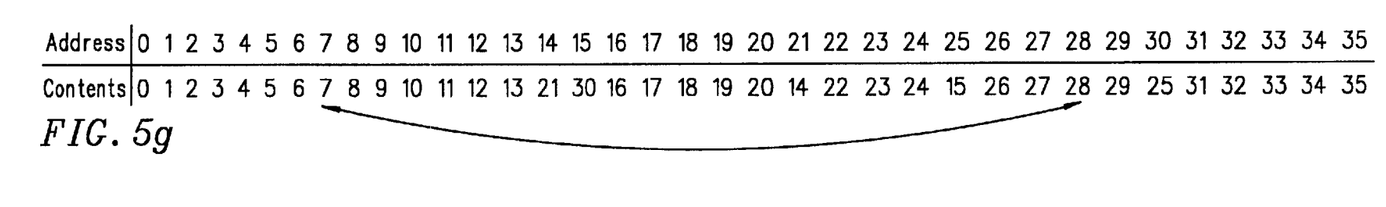
Figure 5H:
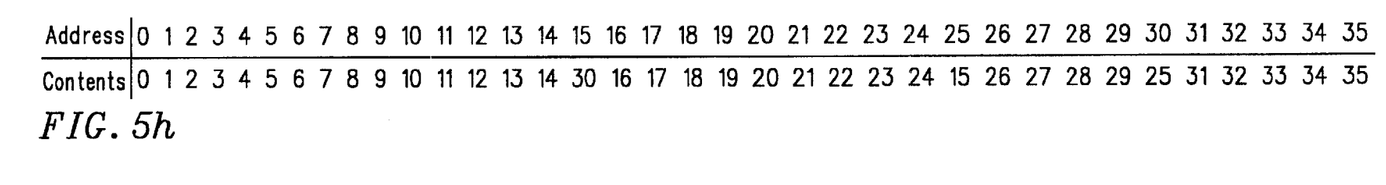
Figure 5I:
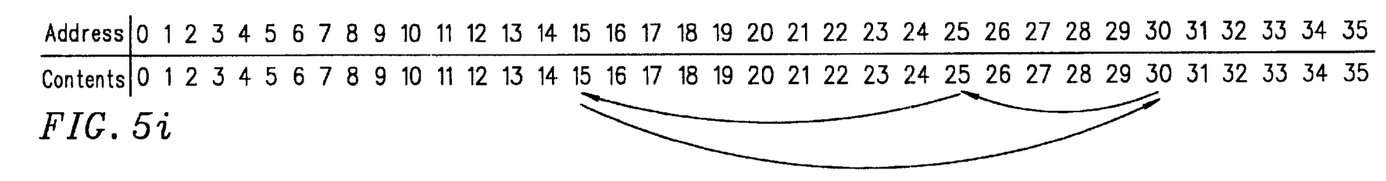

The next unplanarized address is Address 3 (see FIG. 5d). After planarizing the 3-Cycle, the Phase II table indicates that 1, 2, 3, and 4 have been planarized. The next unplanarized address is five, so the algorithm planarizes the 5-Cycle (FIG. 5e). The 5-Cycle consists of 5, 20, and 10, and has a length L=3, which is a factor of six. After planarizing the 5-Cycle, the Phase II table indicates that 1, 2, 3, 4, and 5 have been planarized.

Now that the Phase II table is full, Phase II has ended. The algorithm then determines whether Phase III should be entered. At this point, there are 36 bytes total in the image. There are two stationary bytes, i.e. bytes that need not be moved. A total of 21 bytes have been moved so far. Therefore, there are still 13 bytes (36−2−21=13) that must be moved. Accordingly, Phase III must be entered.

In Phase III, the algorithm locates the next address that is not a multiple of any member of the 1-Cycle. The 1-Cycle table shows that 1 and 4 were planarized. Therefore, Phase III ignores all multiples of four. Because the Phase II table ended at Address 5, Phase III begins with the 6-Cycle. Six is not a multiple of four, so it is assumed that the 6-Cycle has not yet been planarized. Accordingly, the 6-Cycle is planarized (see FIG. 5f).

Next, the 7-Cycle is planarized (see FIG. 5g) because seven is not divisible by four. After the 7-Cycle, there are five bytes left to move. This is less than the 1-Cycle length (L=6), so the algorithm enters the Q factorization stage of Phase III. Thus, the algorithm only considers addresses that are multiples of Q factors. In this example, the Q factors are 5 and 7 because Q=35=5×7. The 7-Cycle has already been performed, so the next cycle to consider is the 10-Cycle because ten is a multiple of five, which is a factor of Q.

The 10-Cycle planarization is begun. However, since 10×4=40mod35=5 and 10>5, the 10-Cycle is the same as the 5-Cycle. Thus, the 10-cycle must be restored and skipped. The 14-Cycle is tried next because 14 is a multiple of seven (see FIG. 5h). Then, the 15-Cycle is planarized because 15 is a multiple of 5 (see FIG. 5i). The final 3 bytes of the image are moved during the 15-Cycle. Accordingly, 34 bytes have been moved and there are no more bytes to move because there are 36 bytes in the image, two of which are stationary, and 34 of which have been moved. Therefore, the planarization is complete.

As discussed above, this algorithm is easily inverted to convert planar images to interleaved-format. For this discussion, let the interleaved-to-planar form be called the "forward algorithm," and let the planar-to-interleaved form be called the "inverse algorithm." Then, the inverse algorithm is nearly identical to the forward algorithm. The only necessary change is to interchange all occurrences of the functions C(i) and $C^{-1}$(i) which are used to find the "next" and "previous" addresses that occur within a cycle. In other words, wherever the forward algorithm calls for the C(i) function, the inverse algorithm calls for $C^{-1}$(i), and wherever the forward algorithm calls for the $C^{-1}$(i) function, the inverse algorithm calls for C(i). Conceptually, this means that the only difference between the two algorithms is the direction in which they traverse each map cycle. All other details, including the progression from phase 1 through phase 3, and including the maintenance of tables that record which addresses have occurred in previous cycles, are identical between the forward and inverse algorithms.

For practical purposes, software that implements the inverse function $C^{-1}$(i) should not use the modulo form $(C^{-1}(i)=Ni \bmod Q)$, because the number N, which stands for the number of pixels in the image, is extremely large. Instead, a software implementation of the inverse function should use the more easily calculated form:

$$C^{-1}(i)=j*N+(i-j)/4,$$

where j=(i mod 4).

This expression can be implemented as efficiently as, and perhaps even more efficiently than, the original expression C(i). This is because the operations modulo-4 and divide-by-4 are both simple binary calculations that are atomic on virtually all microprocessors or other binary computing devices.

To illustrate the inverse algorithm, refer to the example in FIG. 4. If this example were processed by the inverse algorithm, then the structure and makeup of all eight cycles would still be identical, and the method of finding all of these cycles would be identical, but each cycle's bytes would be copied in the reverse direction. As depicted in the figure, this corresponds to merely reversing the directions of the arrows that are shown for each cycle. For example, the 1-cycle would be converted from planar to interleaved mode by saving the value at address 1 and then making the following sequence of copies: copy address 9 to address 1, 11 to 9, 29 to 11, 16 to 29, 4 to 16, and then the previously saved value of address 1 to address 4.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A method for converting interleaved data to a planar format, comprising the steps of:
   following a first map cycle throughout a frame buffer during a first phase;
   finding additional map cycles and mapping through said frame buffer during a second phase;
   mapping all remaining cycles during a third phase;
   iterating a function, 4N, that maps planar addresses to interleaved addresses to effect said interleaved to planar data format conversion;
   saving the contents of the first address of a conversion cycle; and
   wherein said function performs the remainder of said conversion cycle within said frame buffer.

2. A system for effecting an interleaved to planar data format conversion comprising:
   a CPU for iterating a function that maps planar addresses to interleaved addresses to effect said interleaved to planar data format conversion;
   a frame buffer, in communication with said CPU, for storing said data;
   a "1" cycle table for storing data indicative of addresses visited during a first map cycle through said data; and
   a phase II table for storing data indicative of addresses visited during subsequent map cycles through said data.

3. A method for converting planar data to an interleaved format, comprising the steps of:
   following a first map cycle throughout a frame buffer during a first phase;
   finding additional map cycles and mapping through said frame buffer during a second phase; and
   mapping all remaining cycles during a third phase; and
   iterating a function that maps planar addresses to interleaved addresses to effect said planar to interleaved data format conversion;
   saving the contents of the first address of a conversion cycle; and
   wherein said function performs the remainder of said conversion cycle within said frame buffer.

4. A system for effecting an planar to interleaved data format conversion; comprising:
   a CPU for iterating a function that maps planar addresses to interleaved addresses to effect said planar to interleaved data format conversion;
   a frame buffer, in communication with said CPU, for storing said data;
   a "1" cycle table for storing data indicative of addresses visited during a first map cycle through said data;
   a phase II table for storing data indicative of addresses visited during subsequent map cycles through said data.

5. A method for converting between an interleaved data format and a planar data format, comprising the steps of:
   following a plurality of map cycles throughout a frame buffer;
   iterating a function that maps between interleaved addresses and planar addresses to effect said conversion between said interleaved data format and said planar data format;
   saving the contents of the first address of a conversion cycle; and
   wherein said function performs the remainder of said conversion cycle within said frame buffer.

6. An apparatus for converting between an interleaved data format and a planar data format, comprising:
   a CPU for iterating a function that maps between interleaved addresses and planar addresses to effect said conversion between said interleaved data format and said planar data format;
   a frame buffer, in communication with said CPU, for storing data; and
   a plurality of tables for storing data indicative of addresses visited during a corresponding plurality of map cycles through said data.

* * * * *